United States Patent [19]

Uno et al.

[11] 4,075,641
[45] Feb. 21, 1978

[54] AUTOMATIC EXPOSURE CONTROL DEVICE IN A CAMERA

[75] Inventors: Naoyuki Uno, Urawa; Tetsuji Shono, Ranzan; Fumio Urano, Omiya; Masahiro Kawasaki, Tokyo, all of Japan

[73] Assignee: Asahi Kogaku Kogyo Kabushiki Kaisha, Tokyo, Japan

[21] Appl. No.: 625,613

[22] Filed: Oct. 24, 1975

[30] Foreign Application Priority Data

Oct. 29, 1974 Japan .................................. 49-124563

[51] Int. Cl.² .............................................. G03B 7/08
[52] U.S. Cl. ..................................... 354/43; 354/24; 354/37; 354/60 R; 354/60 A
[58] Field of Search .................. 354/40, 41, 42, 43, 354/44, 60 R, 60 A, 24, 28, 29, 37, 38, 50, 51

[56] References Cited

U.S. PATENT DOCUMENTS 3,798,661 3/1974 Taguchi .................................. 354/44
3,863,263 1/1975 Itagaki .................................. 354/24

Primary Examiner—Russell E. Adams
Attorney, Agent, or Firm—Sughrue, Rothwell, Mion, Zinn and Macpeak

[57] ABSTRACT

An automatic iris adjustment control for cameras which, using the APEX operational equations, compares the brightness value Bv and film sensitivity value Sv with the iris size indication value Av and shutter speed value Tv. The iris size indicating value Av is derived from the sum of pulses created by a pulse generator which operates in conjunction with the moving adjustment of the iris size. When the values are compared and found equal, an electro-magnet is de-energized stopping the movement of the adjustable iris at the correct iris setting.

11 Claims, 7 Drawing Figures

AUTOMATIC EXPOSURE CONTROL DEVICE IN A CAMERA

BACKGROUND OF THE INVENTION

1. Field of the Invention

The invention relates to a method and apparatus for controlling automatically the lens aperture of any still camera although it is particularly useful in the single-lens reflex type. The exposure control is a feed-back mechanism which supplies information about the present iris setting value to a device for changing the iris setting value if object brightness so requires.

2. Description of the Prior Art

In previous EE automatic exposure cameras, the iris value was determined by clamping the existing reading on an ammeter with combtooth. Cameras of this type have been variously improved and put to practical use with the limitation that they have low mechanical integrity due to the ammeter, which cannot be avoided.

There have been previously proposed systems in which aperture control is by means of a closed loop; an electric signal corresponding to the iris value is detected as a resistance value by the variation of relative position of a variable resistor and a brush which interlocks with an iris value decision member or an iris driving member. The difficulty in these systems is that the movement of the contact point between the resistance body and the brush is carried out at a speed much higher than normal for a variable resistor; the results being that contact portions severly wear and extraneous noise is generated. Therefore, it is extremely difficult to produce such an apparatus which has a high reliability and durability.

It is therefore an object of this invention to provide a stable apparatus having a high reliability and durability while overcoming those disadvantages as noted above, and the fundamental concept of the invention is to obtain an electric signal corresponding to the iris value by the provision of a contactless structure.

SUMMARY OF THE INVENTION

According to the invention, the foregoing and other objects are attained by the method of using an electric pulse quantized in proportion to the APEX indication value of the iris. In the apparatus for implementation of this method, the pulse is generated by and in conjunction with movement of the iris value decision member or iris driving member and is applied to charge an integrating condenser. Then the charging voltage of the condenser reaches a value determined by the APEX operation (a function of object brightness, film sensitivity and shutter speeds), a voltage comparator de-energizes a magnetic mechanism which stops the iris value decision member or iris driving member at the value appropriate for the APEX value encountered. In one form, the pulses are provided by variation in the relative positions of a Hall element and permanent magnets moving in conjunction with movement of the iris decision member or driving member. In another form, the pulses are generated by a photo-conductive element which receives light through a photochopper that moves in conjunction with the movement of the iris decision member or driving member.

DESCRIPTION OF THE PREFERRED EMBODIMENT

Figure 1:
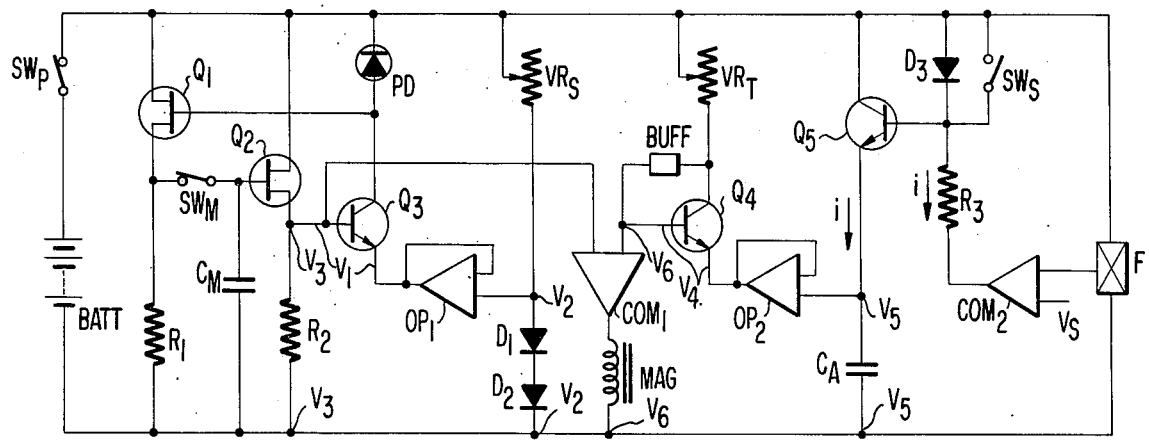
FIG. 1 is a schematic of the electric circuit of the automatic exposure control device according to the present invention.

Referring to FIG. 1 of the drawings, an incident light input from a field to be photographed through a photographing lens system is converted by a photodiode PD into a photocurrent proportional to the light intensity, and transistor $Q_3$ is self-biased from its collector to base through a buffer circuit, which comprises field effect transistors (FET) $Q_1$, $Q_2$ and resistors $R_1$, $R_2$, in such a manner that a collector current of said transistor $Q_3$ becomes equal to said photocurrent. Accordingly, the voltage $V_1$ between the base and emitter of the transistor $Q_3$ is proportional to the logarithmic value of the photocurrent due to the diode characteristic of the base emitter of PN junction of transistor $Q_3$. From this, it will be apparent that the voltage $V_1$ between base and emitter is linearly varied with respect to the variations of the brightness of the field to be photographed and may be varied in direct proportion to the value Bv of APEX indication of the brightness of the field to be photographed.

On the other hand, when the resistance value of variable resistor VRs, based on exposure index of a film is set, the current values of logarithmic conversion diodes $D_1$, $D_2$ are determined by said resistance value. Therefore, the voltage $V_2$ is proportional to the logarithm of the current values through logarithmic conversion diodes $D_1$, $D_2$. Thus, the characteristic of resistance variation of the aforementioned variable resistor VRs may be determined on the basis of the characteristic of the logarithmic conversion diodes $D_1$, $D_2$. These are chosen such that the terminal voltage $V_2$ of the logarithmic conversion diodes $D_1$, $D_2$ is in proportion to the value Sv of APEX indication of the film sensitivity index and the rate of variation thereof becomes equal to the variation rate of the brightness value Bv. Since the voltage $V_2$ is applied to emitter of transistor $Q_3$ through an operational amplifier $OP_1$ which constitutes a voltage follower circuit, the base voltage $V_3$ of the transistor $Q_3$ is given by $$V_3 = V_1 + V_2 \tag{1}$$

and is directly proportional to the sum of Bv and Sv.

Transistor $Q_4$ is self-biased from its collector to base through the buffer circuit BUFF in a manner similar to that of the transistor $Q_3$. The characteristic resistance variation of the variable resistor $VR_t$ is determined so as to produce a collector current variation of the transistor $Q_4$ such that the voltage $V_4$ between base and emitter of the transistor $Q_4$ is in proportion to the value $Tv$ of APEX indication of the shutter speed and the rate of variation thereof becomes equal in relation to the value $Bv$.

Figure 5A:
FIG. 5a illustrates a pulse voltage waveform generated in an iris detector of the invention.
Figure 5B:
FIG. 5b illustrates an output pulse voltage of a comparator utilizing the pulse voltage waveform of FIG. 5a as the input.

The reference character F designates an iris detector such as a magnetic-electric converter including a Hall element and is designed so that voltage is generated at the output end thereof when a magnetic field is present in the vicinity thereof. As permanent magnets pass near the detector, a voltage waveform as shown in FIG. 5a is generated at the output end of the detector due to the presence of the magnetic field of the permanent magnet. The number of times the magnets pass is in direct proportion to the APEX iris indication value $Av$ when interlocked with the iris value decision member or the iris driving member. The output end of the detector is connected to one input terminal of a comparator $COM_2$ while the other input terminal is connected to a suitable reference voltage $Vs$ so as to obtain a desired pulse output, whereby the output pulse waveform as shown in FIG. 5b is generated at the output end of the comparator $COM_2$. A constant electric current $i$ is obtained by dividing the pulse output voltage of the comparator $COM_2$ by the voltage divider composed of the diode resistance of diode $D_3$ and resistor $R_3$. Diode $D_3$ and transistor $Q_5$ are selected so that the diode characteristics of $D_3$ and of the diode formed by the PN junction between the base and emitter of the transistor $Q_5$ are the same; therefore the current $i$ also flows through the collector of transistor $Q_5$. Voltage $V_5$ across a condenser $C_A$ is given by $$V_5 = \frac{1}{C_A} \int_0^t i\, dt$$

wherein $i$ is the current from transistor $Q_5$, $C_A$ is the capacitance of condenser $C_A$ and $t$ is time during which current $i$ is flowing. Since the current $i$ is constant, as previously described, and $V_5$ equals to O ($V_5 =$ O) when $t$ equals to O ($t =$ O), then $$V_5 = 1/C_A\, it$$

Let $t_o$ represent the time width of each pulse and $n$ represent the number of pulses in FIG. 5b, then it is possible to write:

$$V_5 = 1/C_A\, i\, n\, t_o$$

It can now be seen that the Voltage $V_5$ increases stepwise in proportion to the number of pulses, that is, directly in proportion to the iris value $Av$. This voltage $V_5$ is transmitted through an operational amplifier $OP_2$, which is a voltage follower circuit, to the emitter of transistor $Q_4$. Then the voltage $V_6$ of the transistor $Q_4$ is given by $$V_6 = V_4 + V_5$$

thus, the voltage $V_6$ is proportional to the sum of $Tv$ and $Av$.

The voltages $V_6$ and $V_3$ thus obtained are applied as inputs of the comparator $COM_1$, and when $V_3 = V_6$, (essentially the APEX operational equation, $Bv + Sv = Tv + Av$) the magnet mechanism MAG is de-energized.

While the circuit construction and the principle of the operation have been described in general, essential points of the device according to the present invention will further be described in detail. First, the circuit for self-biasing the transistor $Q_3$ comprises a high input resistance type buffer circuit (source follower circuit) including an FET transistor $Q_1$ and a resistor $R_1$, and a hold circuit for keeping a magnet energized including a memory switch $SW_M$, a memory condenser $C_M$, an FET transistor $Q_2$ and a resistor $R_2$, through which the transistor $Q_3$ is baised from collector terminal to base terminal thereof. A voltage, which is the sum of $V_3$, (the sum of voltage $V_1$ prior to the switch $SW_M$ opening, and voltage $V_2$) and the voltage between gate and source $V_{GS}$ of the transistor $Q_2$, is held in the condenser $C_M$ without current leakage due to the high input resistance of the transistor $Q_2$. That is, the sum of $Bv$, prior to the opening of switch $SW_M$, and $Sv$ information may be stored as the voltage $V_3$.

Figure 2:
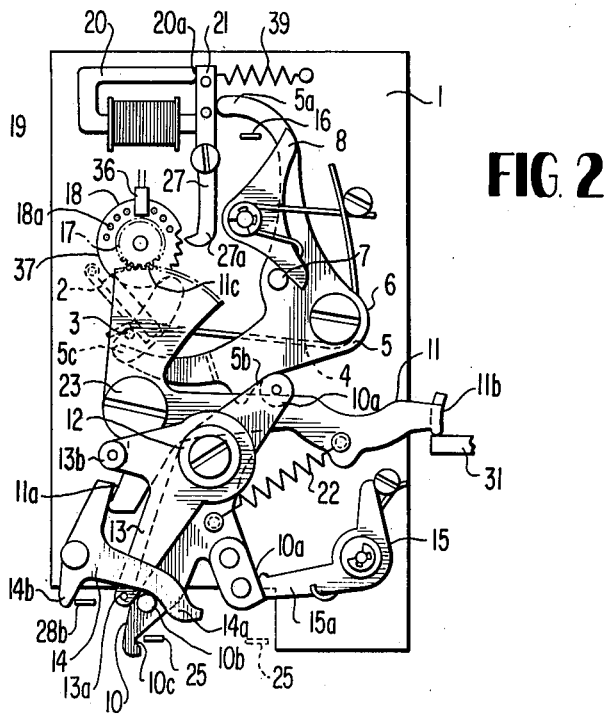
FIG. 2 is a top elevational view of a mechanism in the automatic exposure control device according to the invention, showing a state wherein a film is not yet wound.

In the following, one preferred embodiment in accordance with the conception of the present invention will be described with reference to FIGS. 2 through 5. In FIG. 2, the reference numeral 1 designates a mirror box, 2 a support frame for supporting a reflecting mirror, 3 an operating pin for operating the reflecting mirror erected on the support frame, 4 a pressure spring for pressurizing the reflecting mirror to its 45° given position, 5 a mirror operating lever acting on the operating pin 3 in order to move the support frame 2 upward, said lever being rotated about a shaft 6 mounted on the mirror box 1, and 7 a dowel erected on the mirror operating lever 5, said dowel being engaged by a shutter release lever 8 disposed to release the shutter by triggering a shutter travel stop member 16. An iris driving lever 11 is rotatable about an axis 23 and coupled to a driving lever 10 rotatable about an axis 12 and a spring 22. A driving lever 13 is coaxially movable about the axis 12 of the driving lever 10 and has a roller 13b mounted on an arm thereof, said roller engaging a camlike arm 11a of the iris driving lever 11, and when the driving lever 13 is rotated counterclockwise by means of a drive force of a spring 24 (see FIG. 3) engaged in a hole formed in the other arm of the driving lever 13, the iris driving lever 11 is caused to be rotated counterclockwise by means of roller 13b and arm 11a. The driving lever 10 is prevented from being rotated until the shutter is released by a stop lever 15 interlocked with a shutter release button not shown. The driving lever 10 has a roller 10a mounted on an arm thereof, which is in engagement with the mirror operating lever 5, and a dowel 10b mounted on the other arm thereof, which is in engagement with a lever 14, said dowel 10b being engaged also with an arm 13a of the driving lever 13. A charge lever 25 is in engagement with a groove 10c formed in the nose of the arm of the driving lever 10, and the charge lever 25 is urged to be rotated by means of a return spring 26 leftwards in FIG. 2 while clockwise in FIG. 3.

When winding is effected, the charge lever 25 is moved toward the dotted line portion at the right, the spring 24 is charged to tend to move the driving lever 13 counterclockwise. The lever 14 has an arm 14b to engage a nose 28b in FIG. 3 of a lever 28 rotatable about a post 29, and the lever 28 has the other end 28a to engage a contact piece 30 of a memory switch (corresponding to $SW_M$ in FIG. 1) comprising contact pieces 30 and 30a.

The iris driving lever 11 has a nose 11b to engage an iris lever 31 projected from a bodytube (not shown), which always tends to be moved upward in FIG. 2. The iris driving lever 11 has a sector wheel 11c which is meshed with a pinion gear 17, and a ratchet wheel 18 connected coaxially and integral with said pinion gear 17. The sector wheel 11c, pinion gear 17, and ratchet wheel 18 constitute a governor for slowing down rotation of the iris driving lever 11. A coil 19, corresponding to the magnet MAG in FIG. 1, is wound about a magnet 20, of which nose 20a comes into contact with an armature 21 fixedly mounted on a ratchet lever 27 being designed so that when the bodytube is moved downwardly, the armature 21 will be urged to closely contact the nose 20a of the magnet 20 by the nose 5a of the mirror operating lever 5.

As shown in FIG. 2, small permanent magnets 18a are arranged on the surface of the ratchet wheel 18 in equally spaced relation, and a Hall element 36 is positioned in the vicinity of these permanent magnets 18a. When the iris driving lever 11 is rotated, the ratchet wheel 18 through the sector wheel 11c and the pinion gear 17 is rotated and as a result, the permanent magnets 18a are successviely passed nearby the Hall element 36 to thereby produce pulses, as in FIG. 5a, whose number is proportional to the changing $Av$ as previously mentioned.

Figure 6:
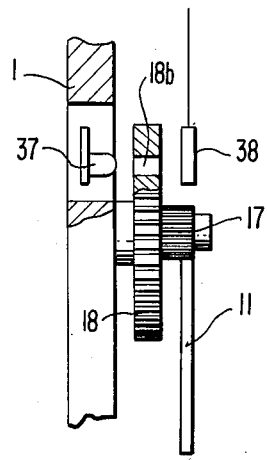
FIG. 6 is a side, elevational view detailing how a photocoupler, which is one of the iris movement detectors in the present invention, is mounted.
Figure 3:
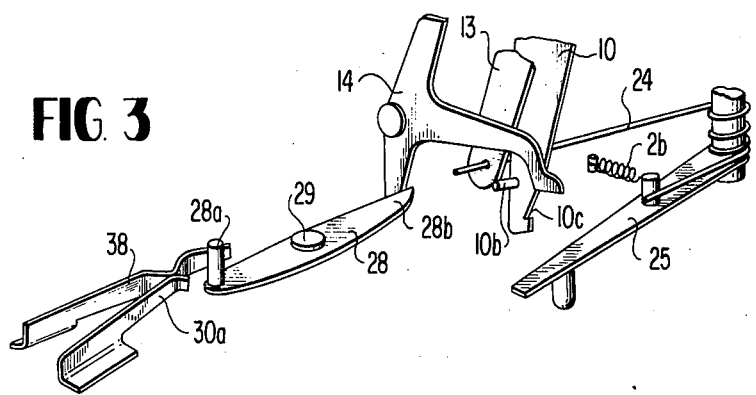
FIG. 3 is a perspective view of the operating mechanism for the memory switch.

Another method considered to produce pulses in the number proportional to $Av$ is the utilization of a photocoupler as in FIG. 6. In brief, small holes 18b are formed in the ratchet wheel 18 in equally spaced relation concentrically with a multitude of ratchet wheels 18. A light source 37, such as a light emitting diode (LED), embedded in the mirror box 1, on the opposite surface of which is arranged a light receiving element 38, and when the iris driving lever 11 is rotated to rotate the ratchet wheel 17, light from the light source 37 is chopped by the holes 18b so that output of the light receiving element 38 may produce pulse waveform voltages as shown in FIG. 5a.

The operation of the invention will now be discussed. FIG. 2 shows one step of the operating processes. During the winding of shutter and film, the charge lever 25 is set to the full right position (indicated by the dotted line), lever 25 thus tensioning spring 24. The shutter release button (not shown) is depressed to thereby rotate the stop lever 15 counterclockwise, thus disengaging the nose 15a of the stop lever 15 from the nose 10a of the driving lever 10. Driving lever 10 begins to rotate counterclockwise with the driving lever 13 since the dowel 10b mounted on the driving lever 10 is urged by the nose 13a of the driving lever 13, which tends to be rotated counterclockwise by means of the spring 24. Rotation of the driving lever 10 causes the cam-like nose 14a of the lever 14 to be elevated by the dowel 10b and the arm 14b urges the nose 28b of the arm of the lever 28. Lever 28 is rotated clockwise, as in FIG. 3, and the pin 28a urges the contact piece 30 to disengage from the contact piece 30a. In this way, the brightness value $Bv$ corresponding to information of brightness in the field to be photographed is stored in the memory condenser $C_M$ along with the film exposure value $Sv$.

On the other hand, the cam surface 5b of the mirror operating lever 5 is pushed up by the roller 10a, with the result that the mirror operating lever 5 is rotated clockwise and the operating pin 3 is pushed up by the nose 5c of the arm of the mirror operating lever 5 to rotate the reflecting mirror frame 2 against the pressure of spring 4. The timing between releasing the memory switch $SW_M$ and movement of mirror frame 2 is such that the mirror movement is delayed until after the opening of switch $SW_M$ and well before the nose 5c of the mirror operating lever 5 comes into contact with the operating pin 3, and thereby accurately storing the $Bv$ corresponding to information of brightness in the field to be photographed. On the other hand, since the roller 13b mounted on the arm of the driving lever 13 urges the cam-like arm 11a, the iris driving lever 11 is rotated counterclockwise and, at the same time, the pinion gear 17 and the ratchet wheel 18 are rotated clockwise by means of the sector wheel 11c.

A power source switch $SW_P$ (see FIG. 1) is turned ON either before the shutter is released or during the initial period when the shutter release button is depressed, energizing the coil 19, and thus magnetizing armature 21 by magnet 20 and disengaging the ratchet pawl 27a from the ratchel wheel 18.

Figure 4:
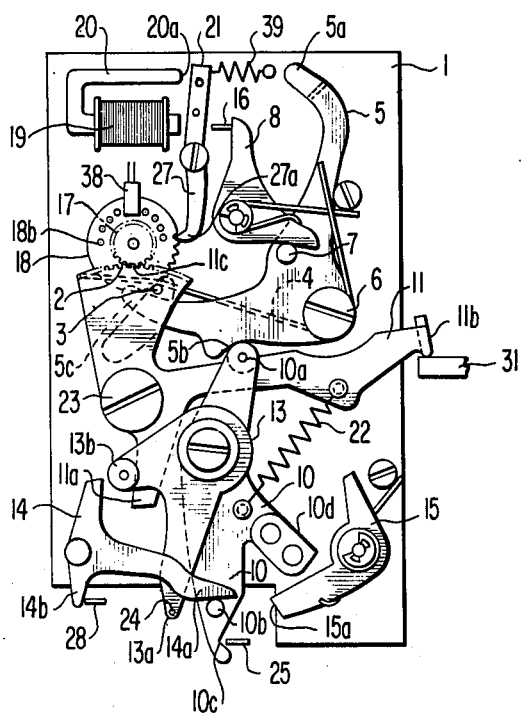
FIG. 4 is a top elevational view of a state wherein a shutter has been released in the mechanism shown in FIG. 2.

With the rotation of the iris driving lever 11, the iris lever 31 in contact with the arm 11b is moved upwardly in FIGS. 2 and 4, and as a result, the iris value is decreased. The ratchet wheel 18 is simultaneously rotated to produce a pulse voltage from the Hall element 36 or photocoupler 38. When the number of pulses reaches a point where $AV = Bv + Sv - Tv$ is given in the APEX operational equation, the current to the coil 19 is cut off so that the magnet 20 will lose its magnetizing force, and accordingly, the ratchet lever 21 is rotated clockwise by means of the spring 39 to cause the ratchet pawl 27a to be meshed with teeth of the ratchet wheel 18 to lock rotation of the ratchet wheel 18 as well as stopping iris driving lever 11. It can be seen that if the subject brightness value is high in the APEX operational equation, the time, as indicated by the number of pulses required to add up to $Av$, will be long allowing the iris value (the lens opening) to be reduced appropriately. This operation occurs nearly instantaneously and the iris value becomes the value to meet the aforesaid APEX operational equation. If the operating speed of the iris driving lever 11 is relatively slower than the time required for the ratchet pawl 27a to engage with the teeth of the ratchet wheel 18, the accuracy can be secured by the use of the aforementioned governor.

When the iris driving lever 11 is stopped, the driving lever 13 urged by spring 24 will also stop since the arm 11a is in engagement with the roller 13b so that the driving lever 10 will lose the driving force through the dowel 10b. However, the spring 22 for connecting the iris driving lever 11 with the driving lever 10 takes over the function of the motivating force for the driving lever 10 so that the driving lever 10 continues to rotate. As the driving lever 10 rotates, the reflecting mirror frame 2 moves upwardly so as not to impair a beam of photographing light from the objective lens to the film surface, and the shutter release lever 8 urges the shutter travel stopping member 16 to the left in FIG. 2 to initiate release of the shutter.

After a lapse of suitable time, and the shutter has completed its travel, the charge lever 25 is released. The charge lever 25 may then be moved clockwise in FIG. 3 and leftward in FIGS. 2 and 4 rotating the driving lever 10 clockwise and the driving lever 13 by means of the dowel 10b clockwise, with the iris driving lever 11 being rotated clockwise by means of the spring 22, thus returning the apparatus to the state as shown in FIG. 2. It will clearly be understood that other members may also be returned to the state shown in FIG. 2 by means of a quick return spring or similar associated member.

In the foregoing description, the pulse width (time) in FIG. 5b could not be made constant unless the ratchet wheel 18 is always rotated at a constant rotational speed from an initial starting period to a termination period without regard to changes in temperature. However, if the comparator COM$_2$ is monstable in operation, pulses of constant time width would always be obtained, irrespective of variation in the period thereof, resulting in accomplishment of the object without any difficulty. It will be further noted that if a magnet 18a in FIG. 2 comes close to the Hall element 36 prior to shutter release, the current i will always be flowing. Therefore, if switch SW$_S$ is closed by interlocking with the iris driving lever 11 during the initial period when it is rotated, such battery drain can be avoided. Switch SW$_s$ shorts out the small potential drop across diode D$_3$ cutting off transistor Q$_5$ which stops the current i.

From the foregoing, according to the present invention there is provided an iris value control automatic exposure camera for stopping the movement of an iris driving member by means of a magnet mechanism, which is capable of performing automatic exposure control with less noise and having a greater durability and reliability.

While a preferred embodiment of the invention has been described in conjunction with a single lens reflex camera, it is to be understood that the invention may be applied to automatic exposure control devices by way of aperture control in all other types of camera.

Although the invention has been described relative to a specific embodiment thereof, it is not so limited and many modifications and variations thereof will be readily apparent to those skilled in the art in the light of the above teachings. It is therefore understood that within the scope of the appended claims the invention may be practiced otherwise than as specifically described.

What is claimed is:

1. An iris adjustment control for cameras which, using the APEX operational equations, compares the brightness value B$v$ and film sensitivity value S$v$ with the iris size indication value A$v$ and shutter speed value T$v$ and automatically adjusts the iris when the shutter release is actuated, said iris adjustment control comprising:
   first means for generating a first voltage proportional to said brightness value B$v$,
   second means for generating a second voltage proportional to said film sensitivity value S$v$,
   memory means connected to said first and second means and responsive to the actuation of the shutter release for storing a third voltage proportional to said first and second voltages,
   third means for generating a fourth voltage proportional to said shutter speed value T$v$,
   iris movement means responsive to the actuation of the shutter release for changing the iris setting at a constant rate from an initial position,
   pulse generating means responsive to the movement of the iris for generting electric pulses having a constant width, the cumulative number of pulses generated being directly proportional to the iris size indication value A$v$ at any point in time during the movement of the iris,
   integrating means receiving said electric pulses and generating a fifth voltage proportional to said iris size indication value A$v$,
   summing means connected to said third means and said integrating means for generting a sixth voltage proportional to the sum of said fourth and fifth voltages,
   comparing means connected to said memory means and said summing means for generating an output when said third and sixth voltages are equal satisfying the APEX equation $$Bv + Sv = Av + Tv,$$

and fifth means responsive to the output of said comparing means to stop further movement of the iris.

2. An apparatus as set forth in claim 1, wherein said iris movement means is a spring-propelled, governor-controlled clockwork mechanism.

3. An apparatus as set forth in claim 1, wherein said pulse generating means comprises a plurality of permanent magnets, circurlarly disposed on a rotating wheel, and rotating in conjunction with said iris movement means and a magnetic field pickup device operatively disposed adjacent to the path of rotation of said magnets such that as said magnets pass by said pickup device electric pulses are produced by said pickup device.

4. An apparatus as set forth in claim 3, wherein said pickup device is a Hall element.

5. An apparatus as set forth in claim 1, wherein said pulse generating means is comprised of a light emitting source, a rotating wheel rotating in conjunction with said iris movement means and having openings disposed circumferentially around it, and a light sensing device aligned such that the rotation of said wheel periodically permits the light from the light emitting source to strike the light sensing device such that electrical pulses are produced thereby.

6. An apparatus as set forth in claim 5, wherein said light emitting source is a light emitting diode and said light sensing element is a photodiode.

7. An apparatus as set forth in claim 5, wherein said pulse generating means further comprises a monostable voltage comparator responsive to said light sensing device and a reference voltage source for producing said constant width pulses.

8. An apparatus as set forth in claim 3, wherein said pulse generating means further comprises a monostable voltage comparator responsive to said magnetic field pickup device and a reference voltage source for producing said constant width pulses.

9. An apparatus as set forth in claim 1, wherein said integrating means comprises:
   constant current generating means for generating constant current pulses having a duration equal to the duration of said electric pulses, and
   a capacitor connected to said constant current generating means for accumulating a charge in response to said constant current pulses, the voltage across said capacitor being said fifth voltage.

10. An iris adjustment control for cameras which, using the APEX operational equations, compares the brightness value B$v$ and film sensitivity value S$v$ with the iris size indication value A$v$ and shutter speed value T$v$ and automatically adjust the iris when the shutter release is actuated, said iris adjustment control comprising:
    a first field effect transistor having source, drain and gate electrodes,
    a first resistor connected to one of said source or drain electrodes of said first field effect transistor, said first field effect transistor and said first resistor forming a first stage of a first buffer circuit, a second field effect transistor having source, drain and gate electrodes, a second resistor connected to one of said source or drain electrodes of said second effect transistor, said second field effect transistor and said second resistor forming a second stage of said first buffer circuit, a memory switch connected between said source or drain electrode of said first field effect transistor and said gate electrode of said second field effect transistor, a memory capacitor connected to the gate electrode of said second field effect transistor so that when said memory switch is closed said capacitor charges to the voltage across said first resistor, a photodiode for generating a photocurrent proportional to the light intensity $Bv$ of a field to be photographed, a first transfer having collector, emitter and base electrodes, said photodiode being connected to the collector electrode of said first transistor, the junction of the collector electrode of said first transistor and said photodiode being connected to the gate electrode of said first field effect transistor, and said source or drain electode of said second field effect transistor being connected to the base electrode of said first transistor, said first transistor being self-biased from its collector to base electrodes through said first buffer circuit, a first variable resistor adjustable in relation to the film sensitivity value, at least one logarithmic conversion diode connected in series with said first variable resistor, the voltage across said at least logarithmic conversion diode being proportional to the indication of film sensitivity index $Sv$, a first operational amplifier in the form of a high impedance voltage follower circuit having an input connected to the junction of said first variable resistor and said at least one logarithmic conversion diode and an output connected to the emitter electrode of said first transistor, the base-emitter PN junction of said first transistor producing a logarithmic conversion of the photocurrent of said photodiode so that the voltage across the base and emitter electrodes of said first transistor is proportional to the brightness value $Bv$ and the voltage across said second resistor is proportional to the sum of the brightness value $Bv$ and the film sensitivity value $Sv$.

iris movement means responsive to the actuation of the shutter release for changing the iris setting at a constant rate from an initial position, pulse generating means responsive to the movement of the iris for generating electric pulses having a constant width, the cumulative number of pulses generated being directly proportional to the iris size indication value $Av$ at any point in time during movement of the iris, integrating means receiving said electric pulses generating a voltage proportional to said iris size indicating value $Av$, a second variable resistor being adjustable in relation to the shutter speed, a second transistor having collector, emitter and base electrodes, said second variable resistor being connected to the collector electrode of said second transistor, the characteristic resistance variation of said second variable resistor being determined so as to produce a collector current variation of said second transistor such that the base-emitter voltage of said second transistor is proportional to the shutter speed value $Tv$, a second buffer circuit connected between the collector and base electrodes of said second transistor, said second transistor being self-biased from its collector to base electrodes through said second buffer circuit, a second operational amplifier in the form of a high inpedance voltage follower circuit having an input connected to said integrator means and its output connected to the emitter electrode of said second transistor, the voltage at the base electrode of said second transistor being proportional to the sum of said iris size indication value $Av$ and shutter speed value $Tv$, a comparator having first and second inputs, said first input being connected to the base electrode of said first transistor and said input being connected to the base electrode of said second transistor, the output of said comparator initially having a first magnitude but switching to a second magnitude when the voltages at said first and second inputs are equal satisfying the APEX equation, $$Bv + Sv = Av + Tv,$$

and an electromagnetically controlled ratchet having an electromagnet connected to the output of said comparator, said ratchet being connected to said iris movement means and permitting movement of the iris when the output of said comparator is said first magnitude and prohibiting further movement of the iris when the output of said comparator switches to said second magnitude.

11. A method of automatically adjusting the iris for cameras which, using the APEX operational equations, compares the brightness value $Bv$ and film sensitivity value $Sv$ with the iris size indication value $Av$ and shutter speed value $Tv$ to adjust the iris when the shutter release is actuated, said method comprising the steps of:

generating a first voltage proportional to said brightness value $Bv$, generating a second voltage proportional to said film sensitivity value $Sv$, storing a third voltage proportional to said first and second voltages in response to the actuation of the shutter release, generating a fourth voltage proportional to said shutter speed value $Tv$, changing the iris setting at a constant rate from an initial position in response to the actuation of the shutter release, generating electric pulses in response to the movement of the iris, said electric pulses having a constant width and the cumulative number of pulses being directly proportional to the iris size indication value $Av$ at any point in time during the movement of the iris, integrating said electric pulses to generate a fifth voltage proportional to said iris size indication value $Av$, summing said fourth and fifth voltages to generate a sixth voltage.

comparing said third and sixth voltages and generating an output signal when said third and sixth voltages are equal satisfying the APEX equation $$Bv + Sv = Av + Tv,$$

and stopping further movement of the iris in response to said output signal.

* * * * *